US009900816B2

(12) United States Patent
Yu et al.

(10) Patent No.: US 9,900,816 B2
(45) Date of Patent: Feb. 20, 2018

(54) METHOD, DEVICE AND SYSTEM FOR CELL RESELECTION

(71) Applicant: ZTE CORPORATION, Shenzhen, Guangdong Province (CN)

(72) Inventors: Yuanfang Yu, Shenzhen (CN); He Huang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/312,189

(22) PCT Filed: Oct. 23, 2014

(86) PCT No.: PCT/CN2014/089259
§ 371 (c)(1),
(2) Date: Nov. 18, 2016

(87) PCT Pub. No.: WO2015/176486
PCT Pub. Date: Nov. 26, 2015

(65) Prior Publication Data
US 2017/0094571 A1     Mar. 30, 2017

(30) Foreign Application Priority Data

May 20, 2014  (CN) .......................... 2014 1 0214624

(51) Int. Cl.
H04W 36/00     (2009.01)
H04W 28/08     (2009.01)
(Continued)

(52) U.S. Cl.
CPC ....... H04W 36/08 (2013.01); H04W 36/0061 (2013.01); H04W 48/18 (2013.01)

(58) Field of Classification Search
CPC .. H04W 36/0061; H04W 36/08; H04W 48/18
(Continued)

(56) References Cited

U.S. PATENT DOCUMENTS 9,642,062 B2 *     5/2017     Huang ................. H04W 36/34
2010/0273485 A1*   10/2010    Huang ................. H04W 36/34
                                                      455/435.3
(Continued)

FOREIGN PATENT DOCUMENTS

CN     101552985 A     10/2009
CN     101646223 A     2/2010
(Continued)

OTHER PUBLICATIONS

R2-063146; Consideration on cell reselection; Huawei; 3GPP TSG RAN WG2 #56, Nov. 6-10, 2006, Riga, Latvia.

*Primary Examiner* — Nathan Taylor
(74) *Attorney, Agent, or Firm* — Ling Wu; Stephen Yang; Ling and Yang Intellectual Property

(57) ABSTRACT

Disclosed in the present document are a method, device and system for a cell reselection. Herein, the method includes: when being in a connected state, a terminal acquiring a plurality of dedicated cell reselection parameter sets related to capability of the terminal from a network side, herein the plurality of dedicated cell reselection parameter sets include: a dedicated cell reselection parameter set applicable to a cell in which capability of a base station and the capability of the terminal have an intersection; the terminal acquiring the capability information of the cell, selecting a corresponding dedicated cell reselection parameter set from the multiple dedicated cell reselection parameter sets according to matching conditions between the capability of the terminal itself and the capability of the cell to configure reselection related parameters of the cell; the terminal performing the cell reselection according to the configured cell reselection related parameters.

18 Claims, 5 Drawing Sheets

(51) Int. Cl.
    *H04W 28/02*     (2009.01)
    *H04W 36/08*     (2009.01)
    *H04W 48/18*     (2009.01)

(58) Field of Classification Search
    USPC .......................................................... 455/436
    See application file for complete search history.

(56) References Cited

U.S. PATENT DOCUMENTS

| | | | | |
|---|---|---|---|---|
| 2011/0003590 A1* | 1/2011 | Yoon | .................... | H04W 36/385 |
| | | | | 455/432.1 |
| 2011/0064059 A1* | 3/2011 | Hooli | .................... | H04W 36/24 |
| | | | | 370/332 |
| 2011/0176424 A1* | 7/2011 | Yang | .................... | H04L 41/0803 |
| | | | | 370/236.2 |
| 2012/0322446 A1* | 12/2012 | Ramachandran | ..... | H04W 48/18 |
| | | | | 455/436 |
| 2014/0038597 A1* | 2/2014 | Wang | ................ | H04W 36/0083 |
| | | | | 455/434 |
| 2014/0335867 A1* | 11/2014 | Hsu | .................... | H04W 52/0225 |
| | | | | 455/437 |
| 2015/0312805 A1* | 10/2015 | Cui | ....................... | H04W 80/04 |
| | | | | 370/331 |
| 2016/0294593 A1* | 10/2016 | Yi | ........................ | H04L 5/0053 |

FOREIGN PATENT DOCUMENTS

| | | |
|---|---|---|
| CN | 101998368 A | 3/2011 |
| CN | 101998527 A | 3/2011 |
| GB | 2481723 A | 1/2012 |

* cited by examiner

METHOD, DEVICE AND SYSTEM FOR CELL RESELECTION

TECHNICAL FIELD

The present document relates to the field of communication, and more particularly, to a method, device and system for a cell reselection.

BACKGROUND

The Long Term Evolution LTE is a long-term evolution of the Universal Mobile Telecommunications System UMTS technology standard established by the Third Generation Partnership Project 3GPP organization. The LTE system introduced key transmission technologies such as Orthogonal Frequency Division Multiplexing OFDM and Multi-Input & Multi-Output MIMO, which significantly increased the spectrum efficiency and the data transmission rate. The technology of the LTE in the phase 1 completed standardization at the end of 2008 and began the commercial network deployment (corresponding to the 3GPP R8/R9 release) in 2009. In order to meet higher demands and more applications of the future wireless communication market and maintain better backward compatibility with the LTE, the 3GPP launched the LTE-Advanced LTE-A research (corresponding to the LTE 3GPP R10 and later release) in 2010. The LTE-A uses key technologies such as Carrier Aggregation, Enhanced UL/DL MIMO, Coordinated Multi-point Tx&Rx, Relay, Enhanced Inter-cell Interference Coordination for Heterogeneous Network to significantly improve the peak data rate, the peak spectrum efficiency, the cell average spectrum efficiency, and user performance at the boundary of the cell, and enhance the networking efficiency of the whole network at the same time. Moreover, with the evolution of the technologies, new technologies have been constantly adopted by the LTE, for example, the LTE-R12 supports new technologies such as TDD-FDD carrier aggregation TDD-FDD CA and small cell dual connectivity and so on to further improve the peak rate and the spectrum efficiency of the wireless communication system, as well as the operating efficiency of the entire network.

Due to the parallel progress of the commercial network deployment and the LTE standard technology evolution, currently base stations using different releases and terminals using different protocol releases widely exist in the market. Considering the difference in functions of the different protocol releases, the functions of devices based on different protocol releases will be quite different (even if the devices are based on the same protocol release, functions supported by different base stations and terminals may still have a big difference considering the manufacturing cost, the target market and other factors), and the maximum capability reached by the terminal under a certain base station depends on the intersection of capability of the terminal and the capability of the base station. For example, a base station based on technology of the 3GPP R11 release, compared to a base station based on technology of the 3GPP R9 release, can support functions such as the carrier aggregation and 8×8 downlink MIMO/4×4 uplink MIMO and so on, and can provide higher transmission rate and efficiency. However, these functions can work effectively only when cooperating with R11 terminals supporting these functions. Since the UE does not consider the capability matching between the terminal and the base station when performing a cell selection or reselection according to the description of the current protocol, the base station cannot configure different cell reselection parameters for UEs with different capabilities, and the terminal cannot acquire the specific capability of the base station through the system message, therefore the terminal cannot reside accordingly based on the capability of the device. If a large number of R9 terminals reside at the cell which is administered by the R11 base stations, or a large number of R11 terminals reside at the cell which is administered by the R9 base stations, the capability of the device cannot function effectively due to the mismatch of releases and capabilities of the base station and the terminal, thus decreasing the transmission efficiency and the rate, and having a very negative impact on the user experience.

In view of the problem that the capability of the device cannot function efficiently due to the mismatch of releases and capabilities of the terminal and the base station, currently no effective solution has been proposed yet.

SUMMARY

An embodiment of the present document provides a method and a device for configuring cell reselection parameters of a terminal, and a method, device and system for a cell reselection, to at least solve the problem that due to the mismatch of releases and capabilities of the terminal and the base station, the capability of a device cannot function efficiently, resulting that the transmission efficiency and the rate are decreased.

According to one aspect of the present document, a method for configuring cell reselection parameters of a terminal is provided. The method includes: a network side configuring a plurality of dedicated cell reselection parameter sets for the terminal, herein the plurality of dedicated cell reselection parameter sets includes: a dedicated cell reselection parameter set applicable to a cell in which capability of a base station and capability of the terminal have an intersection, and a dedicated cell reselection parameter set applicable to a cell in which the capability of the base station and the capability of the terminal do not have an intersection; the network side sending the plurality of cell reselection parameter sets configured for the terminal to the terminal.

Alternatively, the dedicated cell reselection parameter set applicable to a cell in which the capability of the base station and the capability of the terminal have an interaction includes: a first dedicated cell reselection parameter set applicable to a cell in which the capability of the base station and the capability of the terminal match perfectly and/or a second dedicated cell reselection parameter set applicable to a cell in which the capability of the base station and the capability of the terminal have an interaction but do not match perfectly.

Alternatively, the cell reselection parameters in each cell reselection parameter set include at least one of: a cell reselection priority, a signal threshold, and a signal threshold offset value.

Alternatively, before the network side configuring a plurality of dedicated cell reselection parameter sets for the terminal, the method further includes: the network side determining the dedicated reselection parameter sets of the terminal under base stations having different capabilities based on predetermined information of the terminal, herein, the predetermined information includes: capability information and/or subscription category.

Alternatively, before determining the dedicated reselection parameter sets of the terminal under base stations having different capabilities, the method further includes: the network side receiving capability information reported by the terminal.

Alternatively, the method further includes: the network side broadcasting capability information of itself and/or capability information of a neighboring cell so that the terminal configuring parameters corresponding to the network side and/or the neighboring cell according to the plurality of configured cell reselection parameter sets, herein, the capability information includes at least one of: carrier aggregation, enhanced multi-input multi-output MIMO, enhanced interference coordination, and small cell dual connectivity.

Alternatively, the method further includes: the network side receiving the capability information of the neighboring cell reported by the terminal.

According to another aspect of the present document, a cell reselection method is provided. The method includes: a terminal acquiring a plurality of dedicated cell reselection parameter sets related to capability of the terminal from a network side when being in a connected state, herein, the plurality of dedicated cell reselection parameter sets include: a dedicated cell reselection parameter set applicable to a cell in which capability of a base station and capability of a terminal have an intersection, and a dedicated cell reselection parameter set applicable to a cell in which the capability of the base station and the capability of the terminal do not have an intersection; the terminal acquiring capability information of a cell and selecting a corresponding dedicated cell reselection parameter set from the plurality of dedicated cell reselection parameter sets according to the matching condition of the capability of the terminal itself and the capability of the cell to configure the reselection related parameters of the cell; the terminal performing a cell reselection according to the configured reselection related parameters of the cell.

Alternatively, the dedicated cell reselection parameter set applicable to a cell in which the capability of the base station and the capability of the terminal have an interaction include: a first dedicated cell reselection parameter set applicable to a cell in which the capability of the base station and the capability of the terminal perfectly match, and/or a second dedicated cell reselection parameter set applicable to a cell in which the capability of the base station and the capability of the terminal have an interaction but do not match perfectly.

Alternatively, the terminal selecting a corresponding dedicated cell reselection parameter set from the plurality of dedicated cell reselection parameter sets according to the matching condition of the capability of the terminal itself and the capability information of the base station to configure the corresponding parameters of the network side includes: for a cell that perfectly matches with the capability of the terminal, the terminal configuring the reselection related parameters of the cell according to the first dedicated cell reselection parameter set applicable to a cell in which the capability of the base station and the capability of the terminal match perfectly; for a cell in which the capability of the base station and the capability of the terminal have an intersection, the terminal configuring the reselection related parameters of the cell according to the second dedicated cell reselection parameter set applicable to a cell in which the capability of the base station and the capability of the terminal have an interaction but do not match perfectly; for a cell in which the capability of the base station and the capability of the terminal do not have an interaction, the terminal configuring the reselection related parameters of the cell according to the dedicated cell reselection parameter set applicable to a cell in which the capability of the base station and the capability of the terminal do not have an intersection.

Alternatively, the reselection related parameters include at least one of: a reselection priority of the cell, a signal threshold of the cell, and a signal threshold offset of the cell.

Alternatively, after the terminal acquires the plurality of dedicated cell reselection parameter sets, the method includes: the terminal saving the plurality of dedicated cell reselection parameter sets until the terminal re-enters into the connection, or a timer controls to release the plurality of dedicated cell reselection parameter sets.

Alternatively, the terminal acquiring a plurality of dedicated cell reselection parameter sets related to capability of the terminal from a network side when being in a connected state, includes: the terminal receiving a system parameter message sent by the network side, and acquiring the plurality of dedicated cell reselection parameter sets from the system parameter message when being in a connected state.

Alternatively, the terminal acquiring the capability information of a cell includes: the terminal receiving the capability information of the current cell and/or a neighboring cell broadcasted by the network side of the cell in which the terminal currently resides or of the neighbor cell.

Alternatively, after the terminal acquires the capability information of the cell, the method further includes: the terminal reporting the acquired capability information of the cell to the network side of the cell in which the terminal currently resides.

According to still another aspect of the present document, a device for configuring cell reselection parameters of a terminal is provided. The device includes: a configuring module, configured to configure a plurality of dedicated cell reselection parameter sets for a terminal, herein the plurality of the dedicated cell reselection parameter sets includes: a dedicated cell reselection parameter sets applicable to a cell in which the capability of the base station and the capability of the terminal have an intersection, and a dedicated cell reselection parameter sets applicable to a cell in which the capability of the base station and the capability of the terminal do not have an intersection; a sending module, configured to send the plurality of cell reselection parameter sets configured for the terminal to the terminal.

Alternatively, the device further includes: a determining module, configured to determine the dedicated reselection parameter sets for the terminal under base stations having different capabilities according to predetermined information of the terminal, herein, the predetermined information includes capability information and/or subscription category.

Alternatively, the device further includes: a first receiving module, configured to receive the capability information reported by the terminal.

Alternatively, the device further includes: a broadcasting module, configured to broadcast the capability information of the current cell and/or the capability information of a neighboring cell so that the terminal configures parameters corresponding to the network side and/or the neighboring cell according to the plurality of configured cell reselection parameter sets, herein, the capability information includes at least one of: carrier aggregation, enhanced MIMO, enhanced interference coordination, and small cell dual connectivity.

Alternatively, the device further includes: a second receiving module, configured to receive the capability information of the neighboring cells reported by the terminal.

According to still another aspect of the present document, a cell reselection device is provided. The device includes: a first acquiring module, configured to acquire a plurality of dedicated cell reselection parameter sets related to capability of a terminal from a network side, herein, the plurality of dedicated cell reselection parameter sets include: a dedicated cell reselection parameter set applicable to a cell in which the capability of a base station and the capability of the terminal have an intersection, and a dedicated cell reselection parameter sets applicable to a cell in which the capability of the base station and the capability of the terminal do not have an intersection; a second acquiring module, configured to acquire capability information of a cell; a configuring module, configured to select a corresponding dedicated cell reselection parameter set from the plurality of dedicated cell reselection parameter sets according to the matching condition of the capability of the terminal itself and the capability of the cell to configure reselection related parameters of the cell; a reselecting module, configured to perform a cell reselection according to the configured reselection related parameters of the cell.

Alternatively, the device further includes: a saving module, configured to save the plurality of dedicated cell reselection parameter sets until the terminal reenters into the connection or a timer controls to release the plurality of dedicated cell reselection parameter sets.

Alternatively, the device further includes: a reporting module, configured to report the acquired capability information of the cell to the network side in which the cell currently resides.

According to still another aspect of the present document, a cell reselection system is further provided. The system includes: a network side and a terminal, herein the network side includes a device for configuring cell reselection parameter of the abovementioned terminal; the terminal includes the abovementioned cell reselection device.

According to the present document, the network side sends the dedicated cell reselection parameter sets applicable to cells in which the capability of the base station and the capability of the terminal have respectively different matching conditions, and the terminal configures the cell reselection parameters of different cells according to the dedicated cell reselection parameter sets, and uses these cell reselection parameters to perform the cell reselection, so as to solve the problem that due to the mismatches of the releases and capabilities of the terminal and the base station, the capability of the device cannot function efficiently, which results that the transmission efficiency and the rate decrease. Therefore, the condition that the capability of the UE and the capability of the cell mismatch which might occur in the cell reselection of the UE is efficiently improved, and the capability of the device is maximized, and the transmission efficiency and the rate are improved.

BRIEF DESCRIPTION OF THE DRAWINGS

The accompanying drawings described herein are intended to provide a further understanding of the present document and form a part of the present application. The illustrative embodiments and the description of the present document are used to explain the present document, and should not be construed as an improper limitation of the present document. In the accompanying drawings.

SPECIFIC EMBODIMENTS

Hereinafter, in conjunction with the accompanying drawings and embodiments, the present document will be described in detail. It should be noted that, in the case of no conflict, embodiments and features in the embodiments of the present application may be combined with each other.

For the problem that the capabilities of the terminal and the base station in the cell in which the terminal resides do not match, the embodiment of the present document improves technologies so that the UE can take the capability of the device as one of the considerations in the cell reselection, and the capability of the terminal and the capability of the base station can match as much as possible, so as to efficiently improve the case that the capability of the UE and the capability of the cell mismatch that may occur when the UE performs the cell reselection.

According to an embodiment of the present document, a method for configuring cell reselection parameters of a terminal is provided, herein, the method is applied to a network side.

Figure 1:
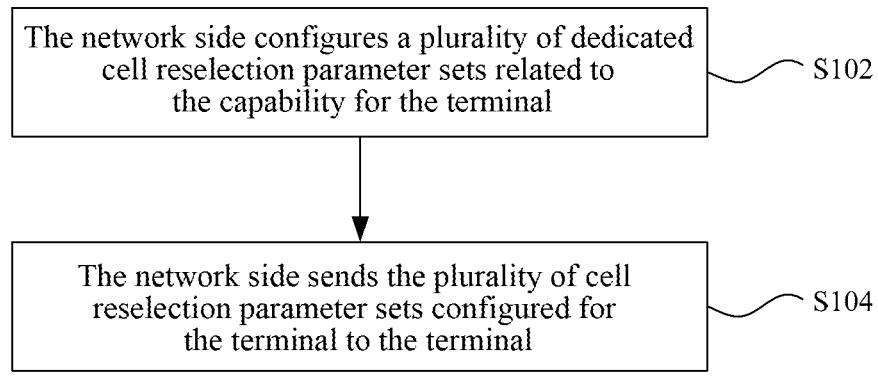
FIG. 1 is a flow chart of a method for configuring cell reselection parameters of a terminal in accordance with an embodiment of the present document.

FIG. 1 is a flow chart of the method for configuring cell reselection parameters of a terminal in accordance with an embodiment of the present document. As shown in FIG. 1, the method mainly includes the following steps:

In step S102, the network side configures a plurality of dedicated cell reselection parameter sets related to the capability for the terminal. Herein, the plurality of dedicated cell reselection parameter sets include: a dedicated cell reselection parameter sets applicable to a cell in which the capability of the base station and the capability of the terminal have an intersection, and a dedicated cell reselection parameter sets applicable to a cell in which the capability of the base station and the capability of the terminal do not have an intersection.

Alternatively, the dedicated cell reselection parameter set applicable to a cell in which the capability of the base station and the capability of the terminal have an intersection include: a first dedicated cell reselection parameter set applicable to a cell in which the capability of the base station and the capability of the terminal match perfectly and/or a second dedicated cell reselection parameter set applicable to a cell in which the capability of the base station and the capability of the terminal have an interaction but do not match perfectly.

In the embodiment of the present document, the dedicated cell reselection parameter sets are respectively called dedicated reselection parameter set 1, dedicated reselection parameter set 2, and dedicated cell reselection parameter set.

Herein, the dedicated reselection parameter set 1 is applicable to a cell in which the capability of the base station and the capability of the terminal match perfectly; the dedicated reselection parameter set 2 is applicable to a cell in which the capability of the base station and the capability of the terminal have an intersection; and the dedicated reselection parameter set 3 is applicable to a cell in which the capability of the base station and the capability of the terminal do not have an intersection.

Alternatively, the dedicated reselection parameter set 2 may be further divided into a plurality of dedicated reselection parameter sets according to the number of capabilities of the intersection between the capabilities of the base station and the capabilities of the terminal.

Alternatively, the cell reselection parameters in each cell reselection parameter set related to the capability include at least one of: a cell reselection priority, a signal threshold, and a signal threshold offset value.

Alternatively, in the embodiment of the present document, based on the capability of the terminal and/or other conditions (such as the subscription category of the terminal), the network may determine the dedicated reselection parameter sets of the terminal under base stations (including neighbor base stations) having different capabilities.

Alternatively, before determining the dedicated reselection parameter sets of the terminal under base stations having different capabilities, the method further includes: the network side receiving capability information reported by the terminal.

Alternatively, in the embodiment of the present document, the network side may further broadcast its own capability information and/or capability information of a neighboring cell so that the terminal configures parameters corresponding to the network side and/or the neighboring cell according to the plurality of configured cell reselection parameter sets. Herein, the capability information includes at least one of: carrier aggregation, enhanced MIMO, enhanced interference coordination, and small cell dual connectivity.

Alternatively, in the embodiment of the present document, after the terminal receives its own capability and/or the capability information of the neighboring cell broadcasted by the network side of other neighboring cell, the terminal may further report the capability information of the neighboring cell to the network side in which the terminal resides. Therefore, the method may further include: the network side receives the capability information of the neighboring cell reported by the terminal.

In step S104, the network side sends the plurality of cell reselection parameter sets configured for the terminal to the terminal.

According to the embodiment of the present document, a cell reselection method is further provided. Herein, the method is applied to the terminal side.

Figure 2:
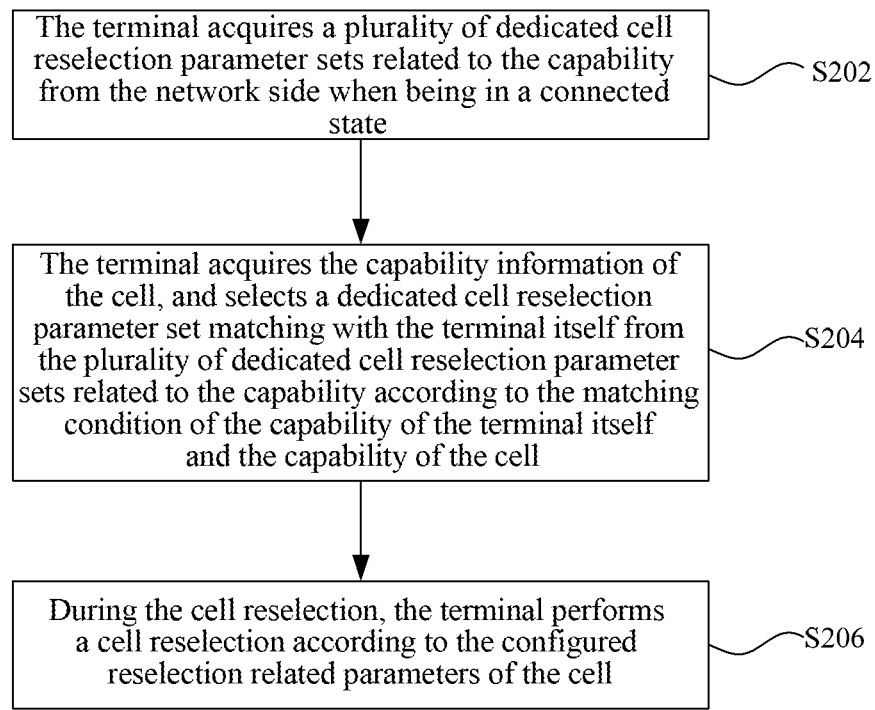
FIG. 2 is a flow chart of the cell reselection method in accordance with an embodiment of the present document.

FIG. 2 is a flow chart of the cell reselection method in accordance with an embodiment of the present document. As shown in FIG. 2, the method mainly includes the following steps:

In step S202, the terminal acquires a plurality of dedicated cell reselection parameter sets related to the capability of the terminal from the network side, when being in a connected state. Herein, the plurality of dedicated cell reselection parameter sets include a dedicated cell reselection parameter sets applicable to a cell in which the capability of the base station and the capability of the terminal have an intersection, and a dedicated cell reselection parameter sets applicable to a cell in which the capability of the base station and the capability of the terminal do not have an intersection.

Alternatively, the dedicated cell reselection parameter set applicable to a cell in which the capability of the base station and the capability of the terminal have an interaction include: a first dedicated cell reselection parameter set applicable to a cell in which the capability of the base station and the capability of the terminal perfectly match and/or a second dedicated cell reselection parameter set applicable to a cell in which the capability of the base station and the capability of the terminal have an interaction but do not match perfectly.

Alternatively, after receiving the abovementioned dedicated cell reselection parameter sets, the terminal saves the dedicated cell reselection parameter sets until the terminal re-enters into the connection, or a timer controls the release of the dedicated cell reselection parameter set.

In step S204, the terminal acquires the capability information of the cell (for example, acquiring through the system parameter message), and selects a dedicated cell reselection parameter set matching with the terminal from the plurality of dedicated cell reselection parameter sets according to the matching condition of the capability of the terminal itself and the capability of the cell.

Herein, for a cell in which the capability of the terminal and the capability of the network match perfectly, the terminal configures the reselection related parameters of the cell according to the dedicated reselection parameter set 1 (the dedicated cell reselection parameter set 1 is applicable to a cell in which the capability of the base station and the capability of the terminal match perfectly). Herein, the reselection parameters include at least one of: a reselection priority of the cell, a signal threshold of the cell, and a signal threshold offset value of the cell.

for a cell in which the capability of the terminal and the capability of the network have a intersection, the terminal configures the reselection related parameters of the cell according to the dedicated cell reselection parameter set 2 (the dedicated cell reselection parameter set 2 is applicable to a cell in which the capability of the base station and the capability of the terminal have an intersection but do not match perfectly). Herein, the reselection related parameters of the cell include at least one of: a reselection priority of the cell, a signal threshold of the cell, and a signal threshold offset of the cell.

For a cell in which the capability of the terminal and the capability of the network do not have an intersection, the terminal configures the reselection related parameters of the cell according to the dedicated cell reselection parameter set 3 (the dedicated cell reselection parameter set 3 is applicable to a cell in which the capability of the base station and the capability of the terminal do not have an intersection). Herein, the reselection related parameters of the cell include at least one of: a reselection priority of the cell, a signal threshold of the cell, and a signal threshold offset value of the cell.

In an alternative embodiment of the embodiment of the present document, the terminal acquiring the capability information of the cell may include: the terminal receives the capability information of the local cell and/or the neighboring cell broadcasted by the network side of the cell in which the terminal currently resides or the neighboring cell.

In an alternative embodiment of the embodiment of the present document, after the terminal receives the capability information of the cell, the method may further include: the terminal reports the acquired capability information of the cell to the network side of the cell in which the terminal currently resides so that the network side can acquire the capability information of the neighboring cell.

In step S206, during the cell reselection, the terminal performs the cell reselection according to the configured reselection related parameters of the cell.

Corresponding to the abovementioned method, the embodiment of the present document further provides a corresponding device.

According to an embodiment of the present document, a device for configuring cell reselection parameters for a terminal is provided to realize the abovementioned method for configuring cell reselection parameters for a terminal.

Figure 3:
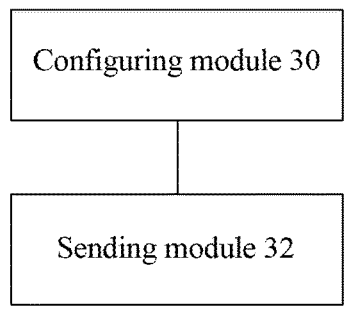
FIG. 3 is a schematic diagram of the structure of a device for configuring cell reselection parameters of a terminal in accordance with an embodiment of the present document.

FIG. 3 is a schematic diagram of the structure of the device for configuring cell reselection parameters of a terminal in accordance with an embodiment of the present document. As shown in FIG. 3, the device mainly includes: configuring module 30 and sending module 32. The configuring module 30 is configured to configure a plurality of dedicated cell reselection parameter sets for a terminal. Herein, the plurality of the dedicated cell reselection parameter sets includes: a dedicated cell reselection parameter set applicable to a cell in which the capability of the base station and the capability of the terminal have an intersection, and a dedicated cell reselection parameter sets applicable to a cell in which the capability of the base station and the capability of the terminal do not have an intersection. The sending module 32 is configured to send the plurality of cell reselection parameter sets configured for the terminal to the terminal.

Alternatively, as the above description, the dedicated cell reselection parameter set applicable to a cell in which the capability of the base station and the capability of the terminal have an intersection include: a first dedicated cell reselection parameter set applicable to a cell in which the capability of the base station and the capability of the terminal match perfectly and/or a second dedicated cell reselection parameter set applicable to a cell in which the capability of the base station and the capability of the terminal have an interaction but do not match perfectly.

Alternatively, the cell reselection parameters in each cell reselection parameter set include at least one of: a reselection priority, a signal threshold, and a signal threshold offset value of the cell.

Alternatively, the device may further include: a determining module, configured to determine the dedicated reselection parameter sets of the terminal under base stations having different capabilities according to the predetermined information of the terminal. Herein, the predetermined information includes capability information and/or subscription category.

Alternatively, the device may further include: a first receiving module, configured to receive capability information reported by the terminal.

Alternatively, the device may further include: a broadcasting module, configured to broadcast the capability information of the current cell and/or the capability information of the neighboring cell so that the terminal sets parameters corresponding to the network side and/or the neighboring cells according to the plurality of configured cell reselection parameter sets. Herein, the capability information includes at least one of: carrier aggregation, enhanced MIMO, enhanced interference coordination, and small cell dual connectivity.

Alternatively, the device further includes: a second receiving module, configured to receive capability information of the neighboring cell reported by the terminal.

According to the embodiment of the present document, a cell reselection device located at the terminal is provided and configured to realize the abovementioned cell reselection method.

Figure 4:
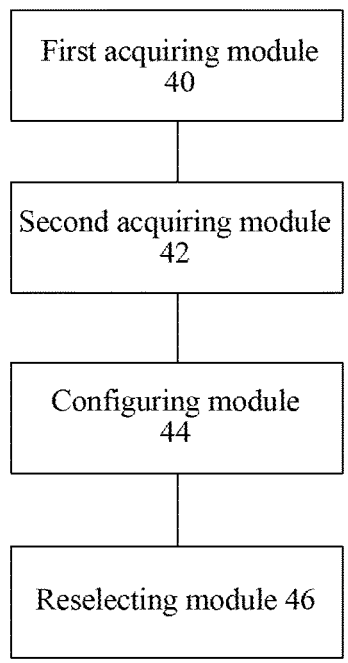
FIG. 4 is a schematic diagram of the structure of a cell reselection device in accordance with an embodiment of the present document.

FIG. 4 is a schematic diagram of the structure of the cell reselection device in accordance with an embodiment of the present document. As shown in FIG. 4, the device mainly includes a first acquiring module 40, a second acquiring module 42, a configuring module 44 and a reselecting module 46. Herein, the first acquiring module 40 is configured to acquire, a plurality of dedicated cell reselection parameter sets related to the capability of the terminal from the network side. Herein, the plurality of dedicated cell reselection parameter sets include: a dedicated cell reselection parameter set applicable to a cell in which the capability of the base station and the capability of the terminal have an intersection, and a dedicated cell reselection parameter sets applicable to a cell in which the capability of the base station and the capability of the terminal do not have an intersection. The second acquiring module 42 is configured to acquire capability information of the cell. The configuring module 44 is configured to select a corresponding dedicated cell reselection parameter set from the plurality of dedicated cell reselection parameter sets according to the matching condition of the capability of the terminal itself and the capability of the cell to configure the reselection related parameters of the cell. The reselecting module 46 is configured to perform a cell reselection according to the reselection related parameters of the cell.

Alternatively, the device may further include a saving module configured to save the plurality of dedicated cell reselection parameter sets until the terminal re-enters into the connection or the timer controls to release the plurality of dedicated cell reselection parameter sets.

Alternatively, the device may further include a reporting module configured to report the acquired capability information of the cell to the network side of the cell in which the terminal currently resides.

According to an embodiment of the present document, a cell reselection system is further provided.

Figure 5:
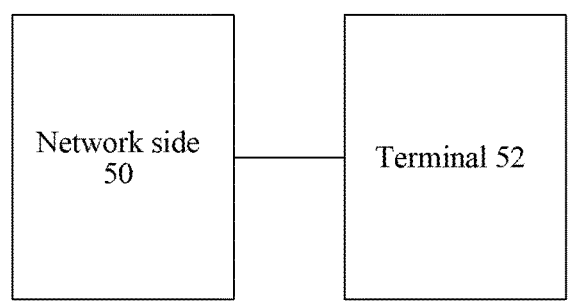
FIG. 5 is a schematic diagram of the structure of a cell reselection system in accordance with an embodiment of the present document.

FIG. 5 is a schematic diagram of the structure of the cell reselection system in accordance with an embodiment of the present document. As shown in FIG. 5, the system includes network side 50 and terminal 52. Herein the network side 50 includes the abovementioned device for configuring cell reselection parameters of a terminal; the terminal 52 includes the abovementioned cell reselection device. The specific functions of the network side 50 and the terminal 52 are described as above and not repeated here.

In the following, the technical solutions provided in the embodiments of the present document will be described with reference to specific embodiments.

Embodiment I

The present embodiment describes the process of the terminal acquiring the capability information of the base station.

Figure 6:
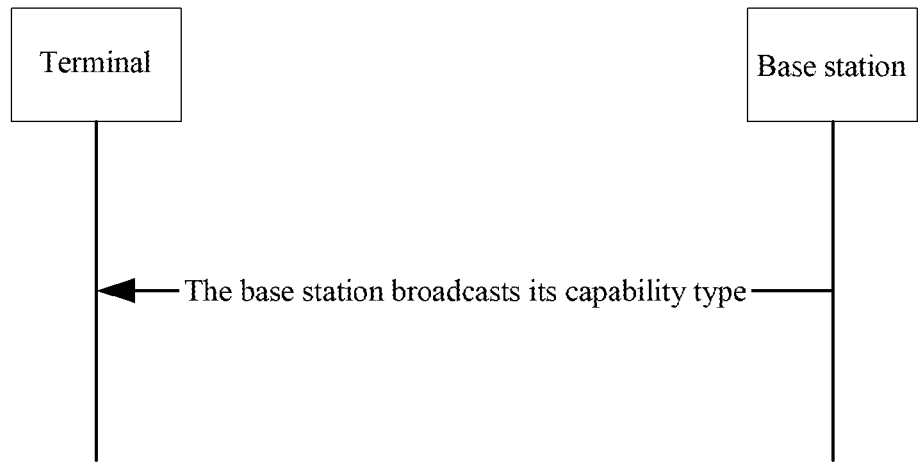
FIG. 6 is a signaling flow chart in accordance with a first embodiment.

FIG. 6 is a signaling flow chart of the terminal acquiring the capability information of the base station in the present embodiment. As shown in FIG. 6, the base station broadcasts its capability information through the system message, the terminal receives the broadcast message to acquire the capability information of the base station. Herein, the base station may explicitly broadcast its capability information. For example, the base station may broadcast that it supports one or more of carrier aggregation, enhanced MIMO, enhanced interference coordination, and small cell dual connectivity and so on. For example, as shown in the following Tables 1 and 2 (option 1), for a base station having the CA and the CoMP, its capability indicator is set as 001001.

TABLE 1

Capability Name
Carrier Aggregation CA
Enhanced MIMO eMIMO
Enhanced Interference Coordination eICIC
Multipoint coordination CoMP
Small Cell Dual Connectivity DC
Other

TABLE 2

| One or more bits Reserved | 1 bit DC | 1 bit CoMP | 1 bit eICIC | 1 bit eMIMO | 1 bit CA |
|---|---|---|---|---|---|

Alternatively, the base station may also broadcast its capabilities implicitly by broadcasting its capability type. As shown in Table 3 below (option 2), and for a base station having the CA and the CoMP, its capability indicator is set as C13.

TABLE 3

| Capability Name | Capability Indicator |
|---|---|
| No capability indication | C0 |
| Carrier aggregation | C1 |
| Enhanced MIMO | C2 |
| Enhanced interference coordination | C3 |
| Multipoint coordination | C4 |
| Small cell dual connectivity | C5 |
| Other | Reserved |
| Including at least carrier aggregation & enhanced MIMO | C11 |
| Including at least carrier aggregation & enhanced interference coordination | C12 |
| Including at least carrier aggregation & multipoint cooperation | C13 |
| Including at least carrier aggregation & small cell dual connectivity | C14 |
| Including at least enhanced MIMO & enhanced interference coordination | C15 |
| Including at least enhanced MIMO & multipoint coordination | C16 |
| Including at least enhanced MIMO & small cell dual connectivity | C17 |
| Including at least enhanced interference coordination & multi-point coordination | C18 |
| Including at least enhanced interference coordination & small cell dual connectivity | C19 |
| Other | Reserved |

Embodiment II

The present embodiment describes the transmission of the dedicated cell reselection parameters for cells in which the capability of the terminal and the capability of the base station match.

Figure 7:
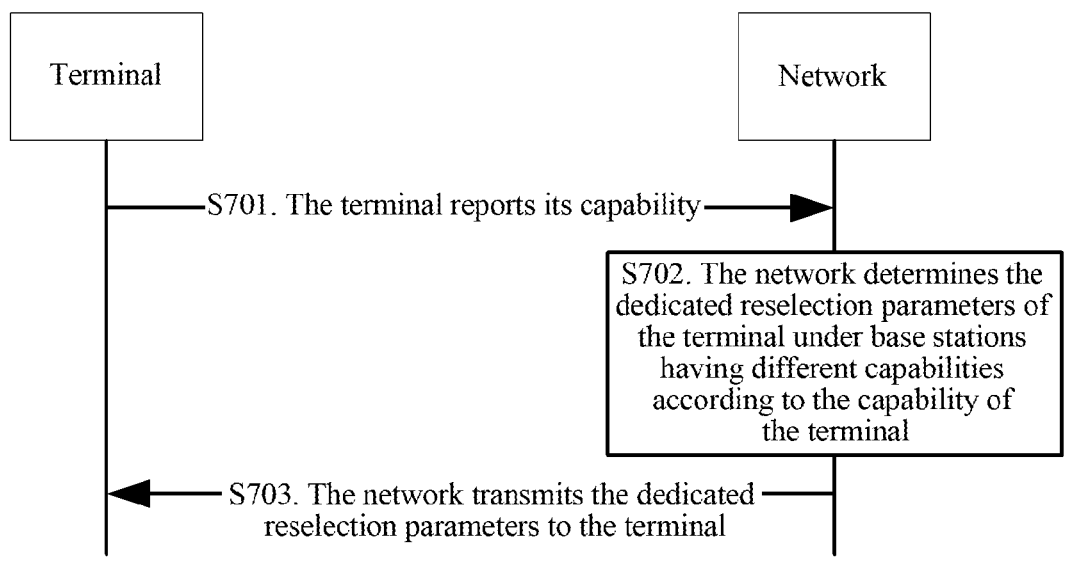
FIG. 7 is a signaling flow chart in accordance with a second embodiment.

FIG. 7 is a schematic diagram of the signaling of transmitting the dedicated cell reselection parameters for cells in which the capability of the terminal and the capability of the base station match in accordance with the present embodiment. As shown in FIG. 7, the following steps are mainly included:

In step S701, the terminal reports its capability to the network, herein, the terminal may report its capability to the network in the form of Table 1/2 or Table 3. For example, the terminal has the CA and CoMP capabilities, and its capability indicator is set as C13 (option 2).

In step S702, the network determines the dedicated reselection parameter sets of the terminal under base stations (including neighboring base stations) having different capabilities according to the capability of the terminal and/or other conditions (such as the subscription category of the terminal). Herein, a dedicated reselection parameter set at least includes one of the following: a reselection priority, a signal threshold, and a signal threshold offset value of the cell. The dedicated reselection parameter set 1 is applicable to a cell in which the capability of the base station and the capability of the terminal match perfectly; the dedicated reselection parameter set 2 is applicable to a cell in which the capability of the base station and the capability of the terminal have an intersection; the dedicated reselection parameter set 3 is applicable to a cell in which the capability of the base station and the capability of the terminal do not have an intersection.

For example, if the capability of the base station and the capability of the terminal match perfectly, the cell reselection priority of the base station is set as priority 1; if the capability of the base station and the capability of the terminal have an intersection, the cell reselection priority of the base station is set as priority 2; if the capability of the base station and the capability of the terminal do not have an intersection, the cell reselection priority of the base station is set as priority 3. Herein, priority 1>priority 2>priority 3 indicates that the priority 1 is higher than the priority 2 and the priority 3.

If the capability of the base station and the capability of the terminal match perfectly, the cell reselection signal threshold offset value of the base station is set as offset 1. If the capability of the base station and the capability of the terminal have an intersection, the cell reselection signal threshold offset value of the base station is set as offset 2. If the capability of the base station and the capability of the terminal do not have an intersection, the cell reselection signal threshold offset value of the base station is set as offset 3. Herein, offset 1<offset 2<offset 3.

Herein, for terminals having the same radio capability but different subscription levels, their dedicated reselection parameters may be different.

In step S703, the network transmits the dedicated reselection parameter set to the terminal.

Embodiment III

The present embodiment describes a dedicated cell reselection method based on a condition that the capability of the terminal and the capability of the base station match.

Figure 8:
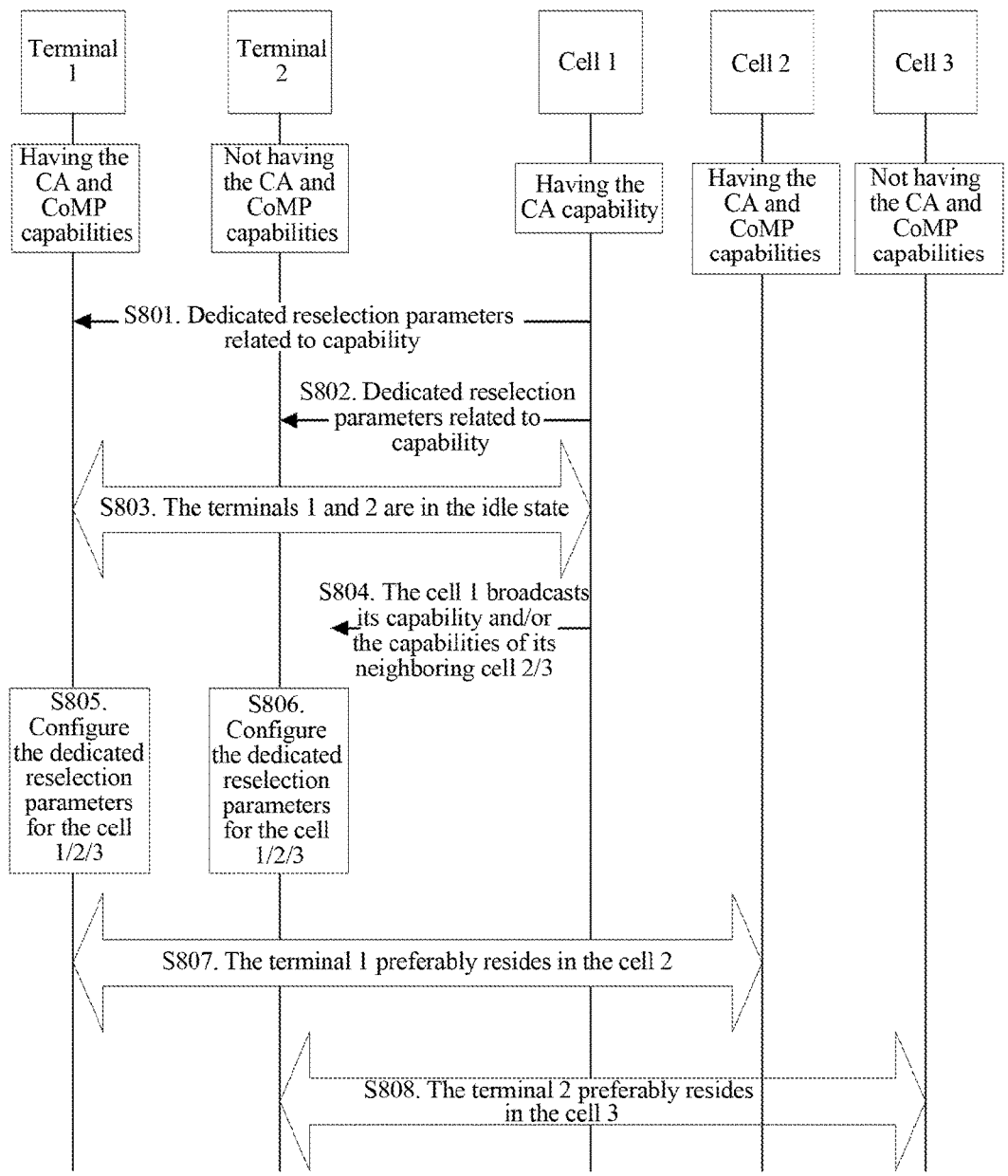
FIG. 8 is a signaling flow chart in accordance with a third embodiment.

Assumed that the terminal 1 has the CA and CoMP capabilities, while the terminal 2 does not have the CA and CoMP capabilities, FIG. 8 is a schematic diagram of the signaling of the dedicated cell reselection method based on a condition that the capabilities of the terminal and the capabilities of the base station match in the present embodiment. As shown in FIG. 8, in the present embodiment, the dedicated cell reselection method based on the condition that the capabilities of the terminal and the capabilities of the base station match mainly includes the following steps:

In step S801-802, the terminal 1 and the terminal 2 respectively acquire, from the cell 1, the dedicated cell reselection parameter sets when being in the connected state.

Herein, the dedicated cell reselection parameters of the terminal 1 include: the priority being 7 and the signal threshold offset being 1 in the set 1; the priority being 6 and the signal threshold offset being 2 in the set 2; the priority being 3 and the signal threshold offset being 3 in the set 3.

The dedicated cell reselection parameters of the terminal 2 include: the priority being 7 and the signal threshold offset being 1 in the set 1; the priority being 6 and the signal threshold offset being 2 in the set 2; and the priority being 5 and the signal threshold offset being 3 in the set 3.

In step S803, the terminal 1 and the terminal 2 are in the idle state in the cell 1.

In step S804, the cell 1 broadcasts its capability information and/or the capability information of its neighboring cell 2 and neighboring cell 3. Herein, the cell 1 only has the CA capability, the cell 2 has the CA and CoMP capabilities, and the cell 3 does not have the CA or CoMP capability.

in step S805, the terminal 1 respectively configures the reselection parameters for the cell 1 (only supporting the CA), the cell 2 (supporting the CA and the CoMP), and the cell 3 (not supporting the CA or the CoMP) according to its own capabilities (supporting the CA and the CoMP) and the dedicated cell reselection parameters, that is, the priority of the cell 1 is 6, the priority of the cell 2 is 7, and the priority of the cell 3 is 3; the threshold offset of the cell 1 is 2, the threshold offset of the cell 2 is 1, and the threshold of the cell 3 is 3.

In step S806, the terminal 2 respectively configures the reselection parameters for the cell 1 (only supporting the CA), the cell 2 (supporting the CA and the CoMP) and the cell 3 (not supporting the CA or the CoMP) according to its own capability (not supporting the CA or the CoMP) and the dedicated cell reselection parameters, that is, the priority of the cell 1 is 6, the priority of the cell 2 is 5, and the priority of the cell 3 is 7; the threshold offset of the cell 1 is 2, the threshold offset of the cell 2 is 3, and the threshold offset of the cell 3 is 1.

In step S807, the terminal 1 reselects the cell 2 which matches with its capabilities according to the dedicated reselection parameters determined in step 5.

In step S808, the terminal 2 reselects the cell 3 which matches with its capability according to the dedicated reselection parameters determined in step 6.

Embodiment IV

In the present embodiment, the method for the base station acquiring the capability of base stations in neighboring cells will be described.

Figure 9:
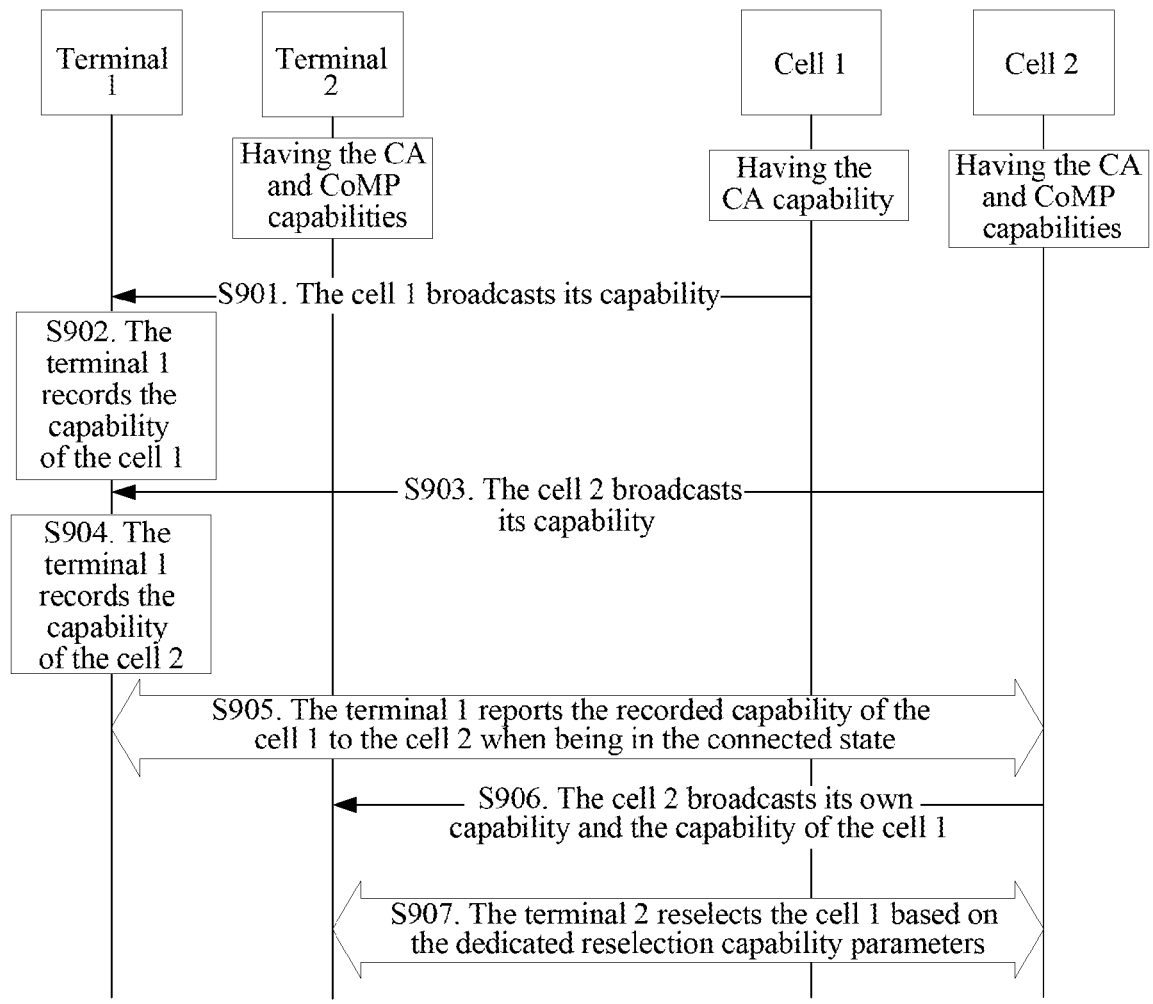
FIG. 9 is a signaling flow chart in accordance with a fourth embodiment.

FIG. 9 is a signaling flow chart of acquiring the capability of the base station in the neighboring cell in the present embodiment. As shown in FIG. 9, the following steps are mainly included:

In step S901, the cell 1 broadcasts its capability; and in the present embodiment, it is assumed that the cell 1 does not know the capability of the cell 2 at the time.

In step S902, the terminal in the range of the cell 1 records the capability of the cell 1.

In step S903, the cell 2 broadcasts its capability.

In step S904, the terminal 1 reselects the cell 2, acquires and records the capability of the cell 2.

In step S905, the terminal 1 reports the recorded capability of the cell 1 to the cell 2 in the connected state.

In step S906, the cell 2 broadcasts its own capability and the capability of its neighboring cell 1.

In step S907, the terminal 2 (having the CA capability) in the idle state and located in the cell 2 may select to reside in the cell 1 based on the capability of the cell 1 (having the CA capability) and the capabilities of the cell 2 (having the CA and CoMP capabilities).

From the above description, it can be seen that in the embodiment of the present document, the terminal performs a cell reselection based on the capability matching between the UE and the base station, so that the UE can take the capability of the device as one of the considerations in the cell reselection, and match the capability of the terminal with the capability of the base station as much as possible, so as to effectively improve the condition that the capability of the UE and the capability of the cell mismatch when the UE performs the cell reselection.

It will be apparent to those skilled in the art that the various modules or steps of the present document described above may be implemented with general purpose computing devices, and may be centralized on a single computing device or distributed on a network consisting of a plurality of computing devices. Alternatively, they may be implemented with program codes executable by a computing means so that they may be stored in a storage means and executed by the computing means. In some cases, they may be executed in an order different from the steps shown or described herein, or they may be separately made into individual integrated circuit modules, or a plurality of modules or steps among them is made into a single integrated circuit module. Thus, the present document is not limited to any particular combination of hardware and software.

The above description is only the alternative embodiments of the present document and is not intended to limit the present document. For a person skilled in the art, the present document may have various changes and modifications. Any modifications, equivalent substitutions, improvements and the like made within the essence and principles of the present document are intended to be within the protection scope of the present document.

INDUSTRIAL APPLICABILITY

As above description, the cell reselection method, device and system provided in the embodiment of the present document have the following beneficial effects: the condition that the capability of the UE and the capability of the cell mismatch which might occur in the cell reselection of the UE is efficiently improved, the capability of the device is maximized, and the transmission efficiency and the rate are improved.

What is claimed is:

1. A method for configuring cell reselection parameters of a terminal, comprising:
   a network side configuring a plurality of dedicated cell reselection parameter sets for the terminal, wherein, the plurality of dedicated cell reselection parameter sets comprises: a dedicated cell reselection parameter set applicable to a cell in which capability of a base station and capability of the terminal have an intersection, and a dedicated cell reselection parameter set applicable to a cell in which the capability of the base station and the capability of the terminal do not have an intersection;
   the network side sending the plurality of cell reselection parameter sets configured for the terminal to the terminal;
   the network side broadcasting capability information of itself and/or capability information of a neighboring cell so that the terminal configuring parameters corresponding to the network side and/or the neighboring cell according to the plurality of configured cell reselection parameter sets, wherein, the capability information comprises at least one of: carrier aggregation, enhanced multi-input multi-output MIMO, enhanced interference coordination, and small cell dual connectivity.

2. The method of claim 1, wherein, the dedicated cell reselection parameter set applicable to a cell in which the capability of the base station and the capability of the terminal have an intersection comprises: a first dedicated cell reselection parameter set applicable to a cell in which the capability of the base station and the capability of the terminal match perfectly and/or a second dedicated cell reselection parameter set applicable to a cell in which the capability of the base station and the capability of the terminal have an intersection but do not match perfectly.

3. The method of claim 1, wherein, the cell reselection parameters in each cell reselection parameter set comprise at least one of: a cell reselection priority, a signal threshold, and a signal threshold offset value.

4. The method of claim 1, wherein, before the network side configuring a plurality of dedicated cell reselection parameter sets for the terminal, the method further comprises: the network side determining dedicated reselection parameter sets of the terminal under base stations having different capabilities according to predetermined information of the terminal, wherein, the predetermined information comprises: capability information and/or subscription category.

5. The method of claim 4, wherein, before determining the dedicated reselection parameter sets of the terminal under base stations having different capabilities, the method further comprises: the network side receiving capability information reported by the terminal.

6. The method of claim 1, wherein, the method further comprises: the network side receiving the capability information of the neighboring cell reported by the terminal.

7. A cell reselection method, comprising:
a terminal acquiring a plurality of dedicated cell reselection parameter sets related to capability of the terminal from a network side when being in a connected state, wherein, the plurality of dedicated cell reselection parameter sets comprise: a dedicated cell reselection parameter set applicable to a cell in which capability of a base station and capability of a terminal have an intersection, and a dedicated cell reselection parameter set applicable to a cell in which the capability of the base station and the capability of the terminal do not have an intersection;
the terminal acquiring capability information of a cell and selecting a corresponding dedicated cell reselection parameter set from the plurality of dedicated cell reselection parameter sets according to a matching condition of the capability of the terminal itself and the capability of the cell to configure reselection related parameters of the cell; wherein, the capability information comprises at least one of: carrier aggregation, enhanced multi-input multi-output MIMO, enhanced interference coordination, and small cell dual connectivity;
the terminal performing a cell reselection according to the configured reselection related parameters of the cell.

8. The method of claim 7, wherein, the dedicated cell reselection parameter set applicable to a cell in which the capability of the base station and the capability of the terminal have an intersection comprise: a first dedicated cell reselection parameter set applicable to a cell in which the capability of the base station and the capability of the terminal perfectly match, and/or a second dedicated cell reselection parameter set applicable to a cell in which the capability of the base station and the capability of the terminal have an intersection but do not match perfectly.

9. The method of claim 8, wherein, the terminal selecting a corresponding dedicated cell reselection parameter set from the plurality of dedicated cell reselection parameter sets according to the matching condition of the capability of the terminal itself and the capability information of the base station to configure the corresponding parameters of the network side comprises:
for a cell that perfectly matches with the capability of the terminal, the terminal configuring the reselection related parameters of the cell according to the first dedicated cell reselection parameter set applicable to a cell in which the capability of the base station and the capability of the terminal match perfectly;
for a cell in which the capability of the base station and the capability of the terminal have an intersection, the terminal configuring the reselection related parameters of the cell according to the second dedicated cell reselection parameter set applicable to a cell in which the capability of the base station and the capability of the terminal have an intersection but do not match perfectly;
for a cell in which the capability of the base station and the capability of the terminal do not have an intersection, the terminal configuring the reselection related parameters of the cell according to a dedicated cell reselection parameter set applicable to a cell in which the capability of the base station and the capability of the terminal do not have an intersection.

10. The method of claim 7, wherein, the reselection related parameters comprise at least one of: a reselection priority of the cell, a signal threshold of the cell, and a signal threshold offset of the cell;
or
wherein, after the terminal acquires the plurality of dedicated cell reselection parameter sets, the method comprises: the terminal saving the plurality of dedicated cell reselection parameter sets until the terminal re-enters into a connection, or a timer controls to release the plurality of dedicated cell reselection parameter sets;
or
wherein, the terminal acquiring a plurality of dedicated cell reselection parameter sets related to capability of the terminal from a network side when being in a connected state, comprises: the terminal receiving a system parameter message sent by the network side, and acquiring the plurality of dedicated cell reselection parameter sets from the system parameter message when being in the connected state.

11. The method of claim 7, wherein, the terminal acquiring capability information of a cell comprises: the terminal receiving the capability information of the current cell and/or a neighboring cell broadcasted by the network side of the cell in which the terminal currently resides or of the neighbor cell.

12. The method of claim 11, wherein, after the terminal acquires the capability information of the cell, the method further comprises:
the terminal reporting the acquired capability information of the cell to the network side of the cell in which the terminal currently resides.

13. A device for configuring cell reselection parameters of a terminal, comprising hardware performing instructions stored in a non-transitory computer readable medium which executes steps in following modules:
a configuring module, configured to configure a plurality of dedicated cell reselection parameter sets for a terminal, wherein the plurality of the dedicated cell reselection parameter sets comprises: a dedicated cell reselection parameter set applicable to a cell in which capability of a base station and capability of the terminal have an intersection, and a dedicated cell reselection parameter set applicable to a cell in which the capability of the base station and the capability of the terminal do not have an intersection;

a sending module, configured to send the plurality of cell reselection parameter sets configured for the terminal to the terminal;

a broadcasting module, configured to broadcast capability information of a current cell and/or capability information of a neighboring cell so that the terminal configures parameters corresponding to the network side and/or the neighboring cell according to the plurality of configured cell reselection parameter sets, wherein, the capability information comprises at least one of: carrier aggregation, enhanced MIMO, enhanced interference coordination, and small cell dual connectivity, a second receiving module, configured to receive the capability information of the neighboring cell reported by the terminal.

14. The device of claim 13, wherein, the hardware performing the instructions stored in the non-transitory computer readable medium further executes steps in a following module: a determining module, configured to determine dedicated reselection parameter sets for the terminal under base stations having different capabilities according to predetermined information of the terminal, wherein, the predetermined information comprises capability information and/or subscription category.

15. The device of claim 14, wherein, the hardware performing the instructions stored in the non-transitory computer readable medium further executes steps in a following module: a first receiving module, configured to receive the capability information reported by the terminal.

16. A cell reselection device, comprising hardware performing instructions stored in a non-transitory computer readable medium which executes steps in following modules:

a first acquiring module, configured to acquire a plurality of dedicated cell reselection parameter sets related to capability of a terminal from a network side, wherein, the plurality of dedicated cell reselection parameter sets comprise: a dedicated cell reselection parameter set applicable to a cell in which capability of a base station and the capability of the terminal have an intersection, and a dedicated cell reselection parameter set applicable to a cell in which the capability of the base station and the capability of the terminal do not have an intersection;

a second acquiring module, configured to acquire capability information of a cell; wherein, the capability information comprises at least one of: carrier aggregation, enhanced multi-input multi-output MIMO, enhanced interference coordination, and small cell dual connectivity;

a configuring module, configured to select a corresponding dedicated cell reselection parameter set from the plurality of dedicated cell reselection parameter sets according to a matching condition of the capability of the terminal itself and the capability of the cell to configure reselection related parameters of the cell;

a reselecting module, configured to perform a cell reselection according to the configured reselection related parameters of the cell.

17. The device of claim 16, wherein, the hardware performing the instructions stored in the non-transitory computer readable medium further executes steps in a following module: a saving module, configured to save the plurality of dedicated cell reselection parameter sets until the terminal re-enters into a connection or a timer controls to release the plurality of dedicated cell reselection parameter sets.

18. The device of claim 16, wherein, the hardware performing the instructions stored in the non-transitory computer readable medium further executes steps in a following module: a reporting module, configured to report the acquired capability information of the cell to the network side of the cell in which the terminal currently resides.

* * * * *